United States Patent [19]
Delamater

[11] Patent Number: 5,903,548
[45] Date of Patent: May 11, 1999

[54] PORTABLE ELECTRONIC COMMUNICATIONS DEVICE HAVING SWITCHABLE LAN/WAN WIRELESS COMMUNICATIONS FEATURES

[75] Inventor: Jeff Delamater, Liberty Lake, Wash.

[73] Assignee: Itronix Corporation, Spokane, Wash.

[21] Appl. No.: 08/769,398

[22] Filed: Dec. 19, 1996

[51] Int. Cl.$^6$ ........................................................ H04J 3/16
[52] U.S. Cl. ........................................... 370/310; 370/463
[58] Field of Search .................................... 370/338, 310, 370/252, 241, 328, 331, 332, 333, 334, 351, 352, 353, 354, 355, 356, 400, 401, 402, 403, 404, 405, 463; 455/436, 437, 438, 439, 440, 432

[56] References Cited

U.S. PATENT DOCUMENTS

| | | |
|---|---|---|
| 4,057,805 | 11/1977 | Dowling . |
| 5,353,334 | 10/1994 | O'Sullivan ................................ 379/59 |
| 5,504,746 | 4/1996 | Meier ....................................... 370/338 |
| 5,602,843 | 2/1997 | Gray ......................................... 370/338 |
| 5,717,688 | 2/1998 | Belanger et al. ........................ 370/338 |
| 5,726,984 | 3/1998 | Kubler et al. ............................ 370/338 |

OTHER PUBLICATIONS

*The Mobile Communications Handbook*, Jerry D. Gibson (ed.), IEEE Press, pp. 560–567 (1996).

*Wireless Communications Principles &Practice*, by Theodore S. Rappaport, pp. 6–9, 439–450, 455–456, IEEE Press (1996).

*Mobile Radio Communications*, Raymond Steele (ed.), pp. 3–5 and 51–54, IEEE Press (1992; reprinted 1994).

*Primary Examiner*—Huy D. Vu
*Attorney, Agent, or Firm*—Wells, St. John, Roberts, Gregory & Matkin, P.S.

[57] ABSTRACT

A portable computing device has a computer programmed to store and communicate information and a housing configured to house the computer. A communications device, provided in the housing, is controlled by the computer and configured to communicate information between the computing device and a remote computer. An antenna is carried by the housing and is configurable to electrically couple with the communications device for communicating radio frequency information with the remote computer. A signal coupling device is carried by the housing and is configured to removably mate in signal transmitting relation with an external antenna via a complementary mating signal coupling device. A switch provided with the device is constructed and arranged to selectively connect the communications device with one of the dedicated antenna and the external antenna. According to one aspect, this invention comprises a portable electronic communications device, comprising a radio frequency modem, wireless communications circuitry, and an antenna operable to communicate over a wireless communications link with one of a local area network and a wide area network; and a proximity detection device operable to detect proximity of the device with the local area network, the wireless communications circuitry responsive to detection of the device within suitable signal communication proximity with the local area network to couple the communications circuitry with the local area network.

22 Claims, 5 Drawing Sheets

PORTABLE ELECTRONIC COMMUNICATIONS DEVICE HAVING SWITCHABLE LAN/WAN WIRELESS COMMUNICATIONS FEATURES

TECHNICAL FIELD

This invention relates generally to portable electronic devices, and more particularly to a portable electronic device having wireless communications features.

BACKGROUND OF THE INVENTION

Portable electronic devices, such as laptop and notebook computers, dataform readers, barcode readers, portable data terminals, work slates, pen computers, portable electrical testing devices, and touch screen displays typically require the ability to communicate data with an external device. Due to the portability of these devices, they are typically remotely powered by a battery pack, enabling their use without connection to power supply or communication lines. Typically, such devices are equipped with one or more forms of memory and an I/O port, enabling intermittent hook-up to a data communications network for transmitting and receiving information therebetween. Additionally, an AC power supply is frequently provided via a power supply port for intermittently connecting the device to a separate power supply during operation, or for recharging batteries contained therein.

One technique for transferring data and/or verbally communicating with an electronic device such as a computer system involves connecting the device to a public switched telephone network (PSTN) via a telephone modem. For example, a telephone modem, short for modulator/demodulator, is often used on a computer and consists of a communications device that enables the computer to transmit information over a standard telephone line. An RJ-11 jack and connector enable coupling of the computer and modem with a telephone line. The modem converts the digitally formatted information of a computer into an analog signal that is capable of being carried over the telephone line to another computer. The receiving computer has a modem that transfers the analog signal transmitted over the telephone line back into a digital signal usable by the receiving computer. Typically, the modem modulates a computer's digital signal onto a continuous carrier frequency over the telephone line. When receiving, the modem demodulates the information from the carrier, transferring it into digital form for use by the computer. However, it is sometimes inconvenient to utilize a telephone line for coupling together computer systems. In some cases, a hard wire telephone line is not available to a user for use with the computer. For other cases, the computer or electronic device is required to communicate frequently and intermittently with another computer, which would require frequent coupling and decoupling of a telephone line with a jack on the computer to enable portable movement of the computer and subsequent connection after each cycle of use.

According to another way, some portable electronic devices have a dedicated antenna, a cellular radio telephone, and a cellular radio modem configured to enable communication between the device and an external communication device. For example, portable cellular telephones have self-contained antennas for enabling communication with other similar devices via a cellular network. Additionally, laptop and notebook computers have been configured to couple with a cellular telephone via a PCMCIA slot and a connector to enable transmission of data via a cellular modem between the notebook computer and another communications device. However, cellular telephone airtime can be very expensive. Therefore, there is a need for a way to reduce cellular airtime when sending and receiving data in order to reduce cellular airtime charges.

One attempt to reduce cellular airtime costs, or charges, when sending data has been to implement packet data service for first and second generation cellular systems such as the Cellular Digital Packet Data (CDPD) standard. CDPD provides mobile packet data connectivity via an AMPS channel on a shared basis. Since users are charged on a packet-by-packet basis, CDPD typically transfers data at reduced cost. CDPD coexists with a conventional voice-only cellular system such as AMPS, but it capitalizes on the unused air time which occurs between successive radio channel assignments by the Mobile Switching Center (MSC). However, many applications still require that a considerable amount of data and/or voice communication be implemented. For example, warehouse personnel performing inventory analysis and/or processing orders in a warehouse with portable computing devices having wireless communications capabilities still must transfer a large amount of data, incurring substantial cellular connection charges. Therefore, there is a need to reduce commercial cellular connection charges when performing data/voice transmissions within a defined geographic location such as a warehouse or factory.

The present invention relates to an improved portable electronic device having wireless communications features that minimize use of commercial cellular networks when transmitting data/voice between the device and another device.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

According to one aspect, this invention comprises a portable electronic communications device, comprising a radio frequency modem, wireless communications circuitry, and an antenna operable to communicate over a wireless communications link with one of a local area network and a wide area network; and a proximity detection device operable to detect proximity of the device with the local area network, the wireless communications circuitry responsive to detection of the device within suitable signal communication proximity with the local area network to couple the communications circuitry with the local area network.

According to another aspect, this invention comprises a portable electronic device having communications capabilities, a switchable wireless communications device comprising a radio frequency modem, wireless communications circuitry, and an antenna operable to communicate over a wireless communications link with one of a local area network and a wide area network; and a proximity detection device operable to detect proximity of the device with the local area network, the wireless communications circuitry responsive to detection of the device within suitable signal communication proximity with the local area network to couple the communications circuitry with the local area network.

These and other aspects of the invention are described in more detail with reference to FIGS. 1–6. The present invention provides a portable electronic communications device having a switchable local/wide area wireless communication network.

Figure 1:
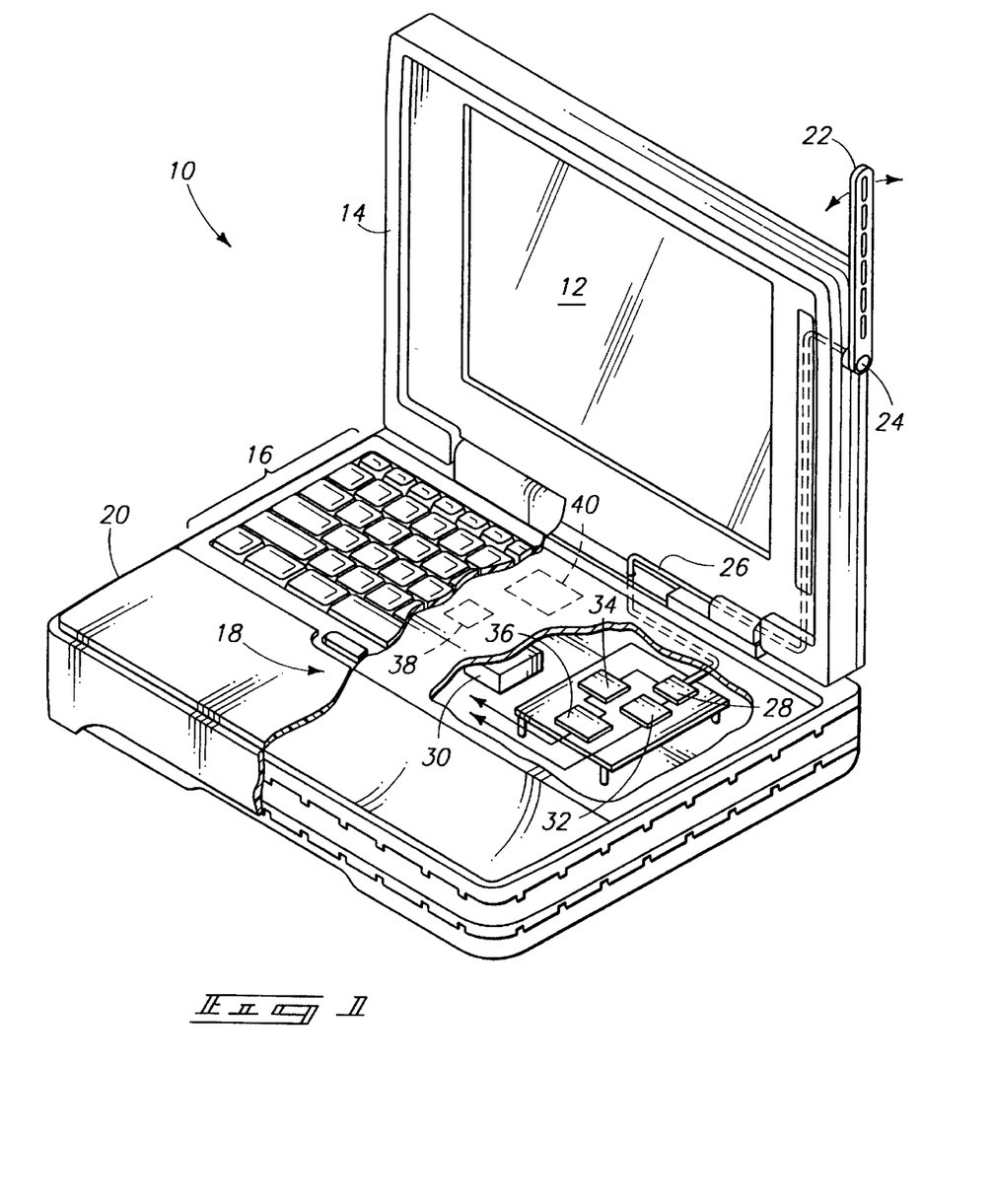
FIG. 1 is a perspective view of a notebook computer having wireless communications features and switching circuitry for selectively configuring the wireless communications features between local and wide area communications networks.

Referring in more detail to the drawings, FIG. 1 illustrates a portable electronic communications device in the form of a personal computer, namely a notebook computer 10, having switchable wireless communications features that reduce operating costs when used in local geographic areas preferably on a privately owned (or user-run) Local Area Network (LAN). The computer has a thin panel display 12 housed within an upper case 14. A keyboard 16 and a tactile input device 18 are provided in a top face of a lower case 20. Upper case 14 is supported in pivotal relation with lower case 20 such that a user can move display 12 and upper case 14 from a closed, or stowed position to a vertically pivoted in-use position. FIG. 1 depicts computer 20 in an open, or in-use configuration. A whip antenna 22 is pivotally carried on an outer edge of upper case 14, enabling vertical orientation of the antenna regardless of orientation of upper case 14 by way of a pivot connection 24.

As shown in FIG. 1, antenna 22 is connected with a coaxial radio frequency (RF) cable 26 to a cellular radio frequency (RF) modem 28 housed within lower case 20. Additionally, a traditional telephone modem 30 usable with a Public Switched Telephone Network (PSTN) system via a telephone line is also provided in lower case 20. Telephone modem 30 is typically used when a standard RJ-11 wall jack and telephone line are available to a user due to the lower use charges of the PSTN system. Accordingly, standard telephone line charges tend to be less expensive than wireless communication charges. Antenna 22 enables wireless communication via cellular radio modem 28, with antenna 22 and modem 28 being operable in both transmit and receive modes.

Computer 10 is preferably a ruggedized laptop, or notebook computer suitable for use in mobile workforce environments such as warehouses, manufacturing facilities, assembly lines, testing facilities, mobile service vehicles, and any application requiring a waterproof and shock resistant portable computer. One such computer 10 suitable for modifying to implement the apparatus and method of this invention is an XC-6000 ruggedized notebook computer presently manufactured and sold by Itronix Corporation of Spokane, Wash. Details of such a ruggedized computer are similar to those disclosed in our U.S. patent application Ser. No. 08/499,488 filed on Jul. 7, 1995 and entitled, "Impact-Resistant Notebook Computer", listing inventors as William F. Erler, Jonathan L. LaMarche, David H. Stockham, and Theodore C. Vollmer. This application Ser. No. 08/499,488, which is now U.S. Pat. No. 5,706,168, is hereby incorporated by reference.

Details of such a computer 10 having an internal radio are similar to those disclosed in Applicant's U.S. patent application Ser. No. 08/633,010 filed on Apr. 16, 1996 and entitled, "Electromagnetically Shielded Laptop Computer Having Internal Radio", listing the inventor as Jeff Delamater. This Ser. No. 08/633,010 application, which is now abandoned, is hereby incorporated by reference. Additional details of such a laptop computer and radio construction are even further disclosed in Applicant's U.S. patent application Ser. No. 08/623,945 filed on Mar. 19, 1996, and entitled "Laptop Computer Having Internal Radio With Interchangeable Antenna Features", listing the inventor as Jeff Delamater. This application Ser. No. 08/623,945, which is now U.S. Pat. No. 5,828,341, is hereby incorporated by reference.

FIG. 1 illustrates notebook computer 10 in a partial breakaway perspective view, enabling visualization of internally housed wired and wireless radio communications features. Antenna 22, carried on the opened upper case 14, is shown pivoted to a vertically oriented position there along. Coaxial radio frequency (RF) cable 26 connects antenna 22 with communications equipment housed within lower case 20. RF cable 26 leaves upper case 14 through one of a pair of hinges, and enters lower case 20 through an LED board carried on the lower case, beneath a plastic trim cover. Radio modem 28, LAN/WAN switching circuitry 32, wireless communications circuitry 34 and a proximity detection device 36 are carried on a daughterboard within case 20. Telephone modem 30 is also mounted within case 20, beneath a motherboard. Preferably, a central processing unit 38, a microcontroller 40, and at least one form of memory device (not shown) are carried on the motherboard within case 20.

Wireless cellular radio frequency modem 28 includes a radio, a receiver, and modulation and demodulation circuitry that connect via RF cable 26 with antenna 22. Radio frequency modem 28 is configurable to selectively transmit and receive radio signal-based information between computer 10 and another device, such as a similarly configured computer. Radio modem 28 is mounted on the daughter board via bosses to the bottom of lower case 20. Telephone modem 62 includes a telephone that is provided to enable direct telephone line connection with computer 20 via a receiving RJ-11 jack provided in the back of the computer.

Figure 2:
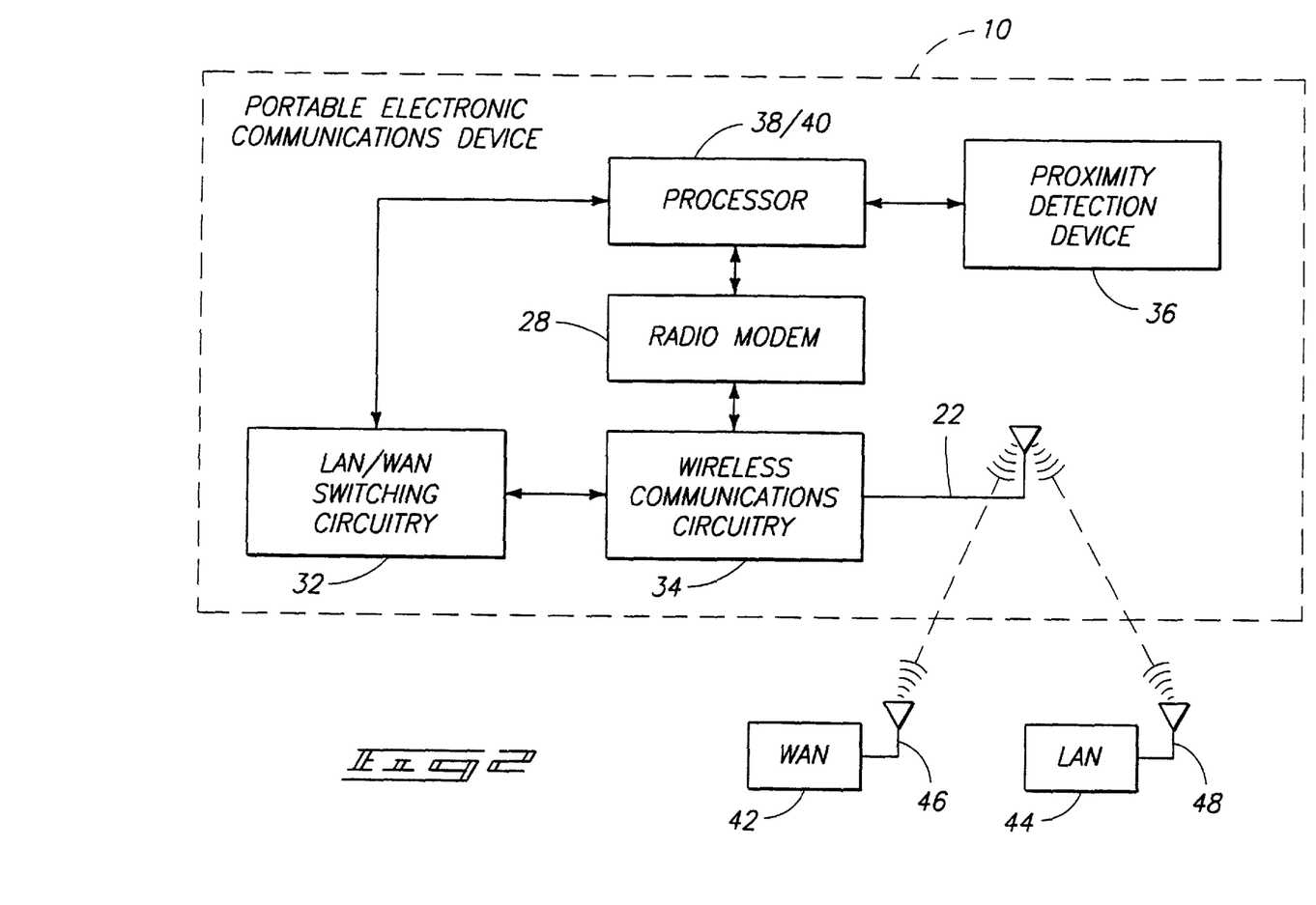
FIG. 2 is a schematic block diagram illustrating a portable electronic communications device having a proximity detection device and switching circuitry for selectively configuring wireless communications between local and wide area networks.

FIG. 2 illustrates a layout for a portable electronic communication device 10 having switchable mobile communications features of this invention provided variously by a processor 38/40, radio modem 28, LAN/WAN switching circuitry 32, wireless communications circuitry 34, antenna 22, and proximity detection circuitry 36. Processor 38/40 is preferably implemented via co-processing of cpu 38 and microcontroller 40. Alternatively, cpu 38 or microcontroller 40 can be individually used to implement the processor. Preferably, portable electronic communications device 10 is at least in part formed by a personal computer (PC) subassembly. Other parts of device 10 not shown can comprise testing components, data analysis components, various signal monitoring circuitry, and computer peripheral components.

According to FIG. 1, telephone modem 30 forms part of a standard Public Switched Telephone Network (PSTN) which uses standard RJ-11 wall-mounted jacks, plugs and cables to connect telephone equipment with a telephone transmission line, or cable. Such features are made available to a user typically at a reduced transmission cost over using a mobile telephone transmission system, so use of modem 30 makes sense when a telephone jack is available to a user. Alternatively, radio modem 28 is provided along with wireless communications circuitry 34, antenna 22, LAN/WAN switching circuitry 34, and proximity detection device 36 for facilitating implementation of the features of Applicant's invention.

Accordingly, processor 38/40 implements cellular data and/or voice communication via radio frequency modem 28, wireless communications circuitry 34 and antenna 22. LAN/WAN switching circuitry 32 is initialized via processor 38/40 to switch wireless communications circuitry 34 for communication with either a Local Area Network (LAN) 44 or a Wide Area Network (WAN) 42. Radio frequency modem 28 talks on WAN 42. Radio frequency modem 28 is implemented on WAN 42 in the form of a wireless radio frequency (RF) network radio modem. Suitable forms of such wireless radio frequency (RF) network radio modems are cellular, RAM™, ARDIS™, or any of a number of available wireless radio frequency (RF) communication systems. Wireless communication circuitry 34 is additional data/voice communication equipment necessary to configure modem 28 for selective communication with either WAN 42 or LAN 44.

In order to determine whether wireless communications circuitry 34 should initialize radio frequency modem 28 for communication with WAN 42 or LAN 44, proximity detection device 36 determines whether device 10 is within an acceptable range to communicate with LAN 44. When proximity detection device 36 determines that device 10 is within an acceptable range, LAN/WAN switching circuitry 32, via commands from processor 38/40, configures wireless communications circuitry 34 for wireless communication with LAN 44, via antenna 48. When proximity detection device 36 determines that device 10 is outside an acceptable signal communication range with LAN 44, LAN/WAN switching circuity 32 configures wireless communications circuitry 34 for wireless communication with WAN 42, via antenna 46.

According to FIG. 2, LAN 44 is preferably a user-operated Local Area Network comprising a collection of computers and wireless communications links provided within a work environment, such as a warehouse or an assembly line. More particularly, LAN 44 is user operated, eliminating any wireless radio frequency (RF) airtime charges being incurred by a user working within the warehouse. Similarly, LAN 44 can be configured for operation within a defined local geographic area having acceptable signal transmission characteristics. In this manner, users operating within the local geographic region can eliminate wireless radio frequency (RF) airtime charges when implementing a wireless communication link with LAN 44. Once the user leaves the acceptable range of LAN 44, proximity detection device 36 notifies processor 38/40, which initiates LAN/WAN switching circuitry 32 to switch the wireless communication link to WAN 42. When operating with WAN 42, cellular airtime charges will be incurred. As a user returns within the acceptable range of LAN 44, proximity detection device 36 detects an acceptable range, causing switching via circuitry 32 to a wireless communication link with LAN 44.

Figure 3:
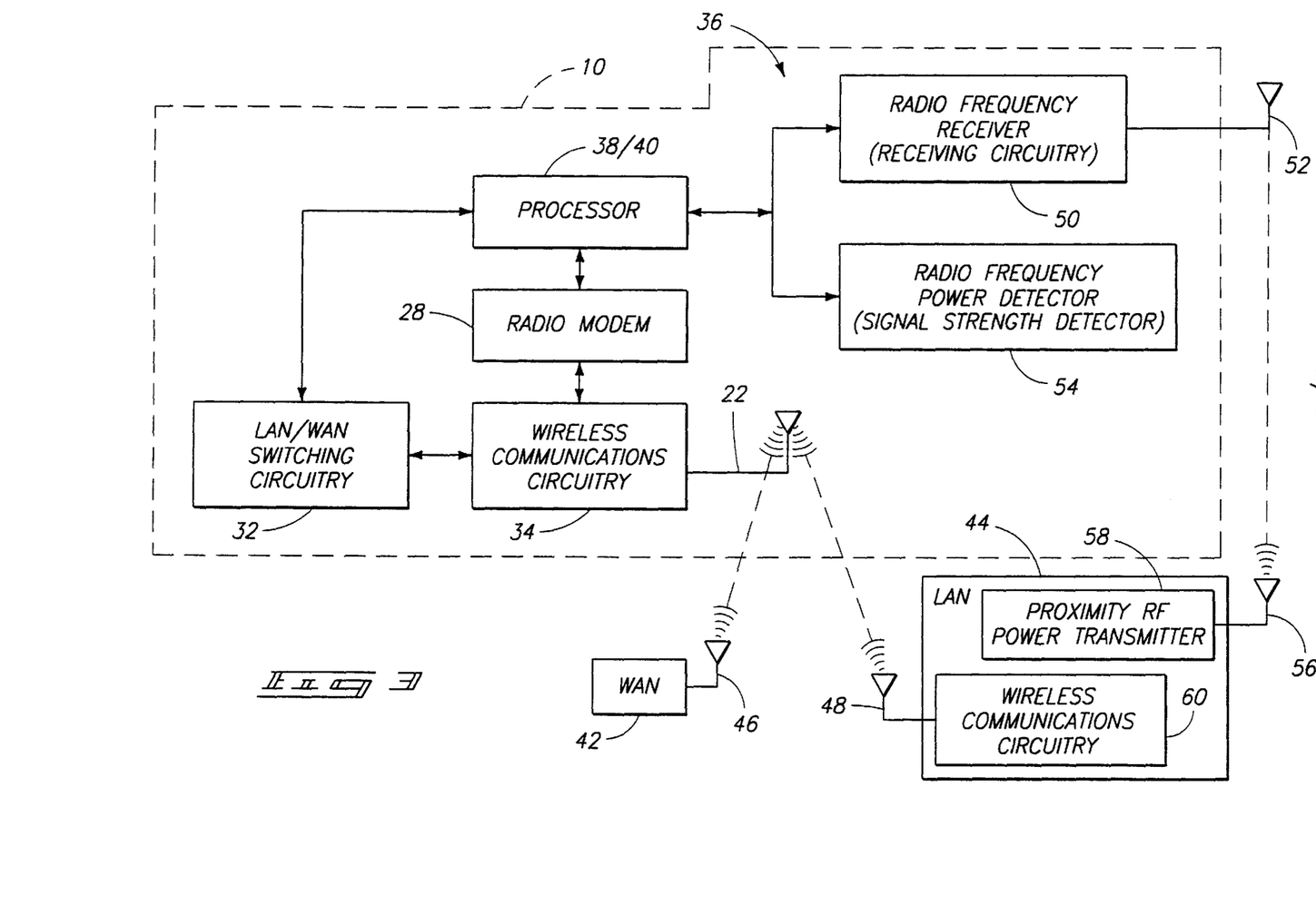
FIG. 3 is a schematic block diagram illustrating in further detail one technique using received radio frequency (RF) power detection for implementing the proximity detection device of FIG. 2.

According to one specific embodiment of a proximity detection device, FIG. 3 illustrates portable electronic communications device 10 having a radio frequency (RF) receiver 50 with an antenna 52 and a radio frequency power detector 54. Proximity detection device 36 determines whether device 10 is within an acceptable range by monitoring signal strength from LAN 44 via proximity detection device 36. More particularly, radio frequency (RF) power detector 54 comprises a signal strength detector communicating with processor 38/40 and RF receiver 50 to detect proximity of device 10 with LAN 44.

LAN 44 has a proximity RF power transmitter 58 configured to send RF signals having a pre-selected frequency and strength via antenna 56 to antenna 52 of device 10. Power detector 54 detects the received power of the signal captured by antenna 52 and receiver 50 via RF signals sent via antenna 56. Based on the distance between antenna 56 and antenna 52, the detected signal strength will vary. As distance increases, detected signal strength decreases. As distance decreases, detected signal strength increases LAN 44 also includes wireless communications circuitry 60 for sending and receiving data/voice communication signals via antenna 48 with communication devices such as device 10. Optionally, antennas 48 and 56 can be combined into a single antenna.

According to FIG. 3, the proximity detection device 36 operates by monitoring radio frequency (RF) signal strength coming from the base, or local area network (LAN) 44 via antenna 56 and transmitter 58. By looking at the RF power received via antenna 56, namely by looking at the amplitude of the analog signal via analog circuitry, the value can be converted via an analog to digital (A/D) converter, then processed by processor 38/40 to evaluate signal strength. Preferably, microcontroller 40 is used to evaluate a data stream from an analog to digital (A/D) converter. According to one construction, radio frequency receiver 50 has a receive signal strength indicator provided therein. The receive signal strength indicator can assess signal amplitude which is proportional to the amount of RF power received from LAN 44 via antenna 56. Hence, the receive signal strength indicator can also be used to assess the proximity of device 10 with LAN 44. Alternatively, radio frequency (RF) receiver 50 and radio frequency (RF) power detector 54 can be incorporated internally within wireless communications circuitry 34. For example, receiving circuitry of receiver 50 and a signal strength detector of detector 54 can be formed internal to wireless communications circuitry 34. Such an implementation would save costs, and antennas 52 and 56, as well as transmitter 58, would be eliminated. Instead, antenna 22 would be used with receiving circuitry 50 in order to detect received signal strength from antenna 48. Such would prove to be a more cost-effective implementation. However, the implementation depicted in FIGS. 2 and 3 better depicts the functionality associated with the implementation.

Also according to the FIG. 3 construction, an acceptable threshold signal strength level is predetermined by a user for transmitting data to transfer between antenna 22 and antenna 48 of LAN 44. Once the data stream becomes corrupted, an associated threshold signal level between antenna 52 and antenna 56 will cause switching circuitry 32 to reconfigure wireless communications circuitry 34 for communication via antenna 22 with WAN 42. In this manner, the less expensive LAN 44 can be used with device 10 when operating within the local geographic region. Once beyond the bounds of LAN 44, circuitry 34 is switched to communicate via wireless communication link with WAN 42. In this manner, proximity detection device 36 forms a proximity sensor that toggles between LAN 44 and WAN 42 as a user of device 10 crosses over a perimeter region, or boundary marker, that is defined by transmitted signal strength between antennas 52 and 56.

Additionally, when implementing the proximity detection device 36 of FIG. 3, screen 12 (of FIG. 1) can be used to display messages and/or graphics which signal to a user that they are crossing a signal limiting barrier by exceeding an acceptable threshold signal between antennas 52 and 56. According to one version, the computer screen notifies a user, and switching between LAN 44 and WAN 42 still occurs automatically. According to another implementation, a user is notified visually via the computer screen, as well as via a speaker on computer 10, and a user is prompted to respond by manually keying in reconfiguration of communications circuitry 34 for transferring between LAN 44 and WAN 42.

According to the implementation of FIG. 3, device 10 looks at radio frequency power received by antenna 52 from antenna 56 of LAN 44. One example involves setting a threshold RF power value of 90 dBm (or 90 decibels below one milliwatt). When RF power received drops below the 90 dBm threshold, switching circuitry 32 switches communication to WAN 42, between antennas 22 and 46. According to this implementation, receiver 50 and antenna 52 are always detecting the presence of signals from antenna 56 of LAN 44, to determine when a user leaves the acceptable range of LAN 44, and returns within the acceptable range in order to selectively switch between WAN 42 and LAN 44.

Figure 4:
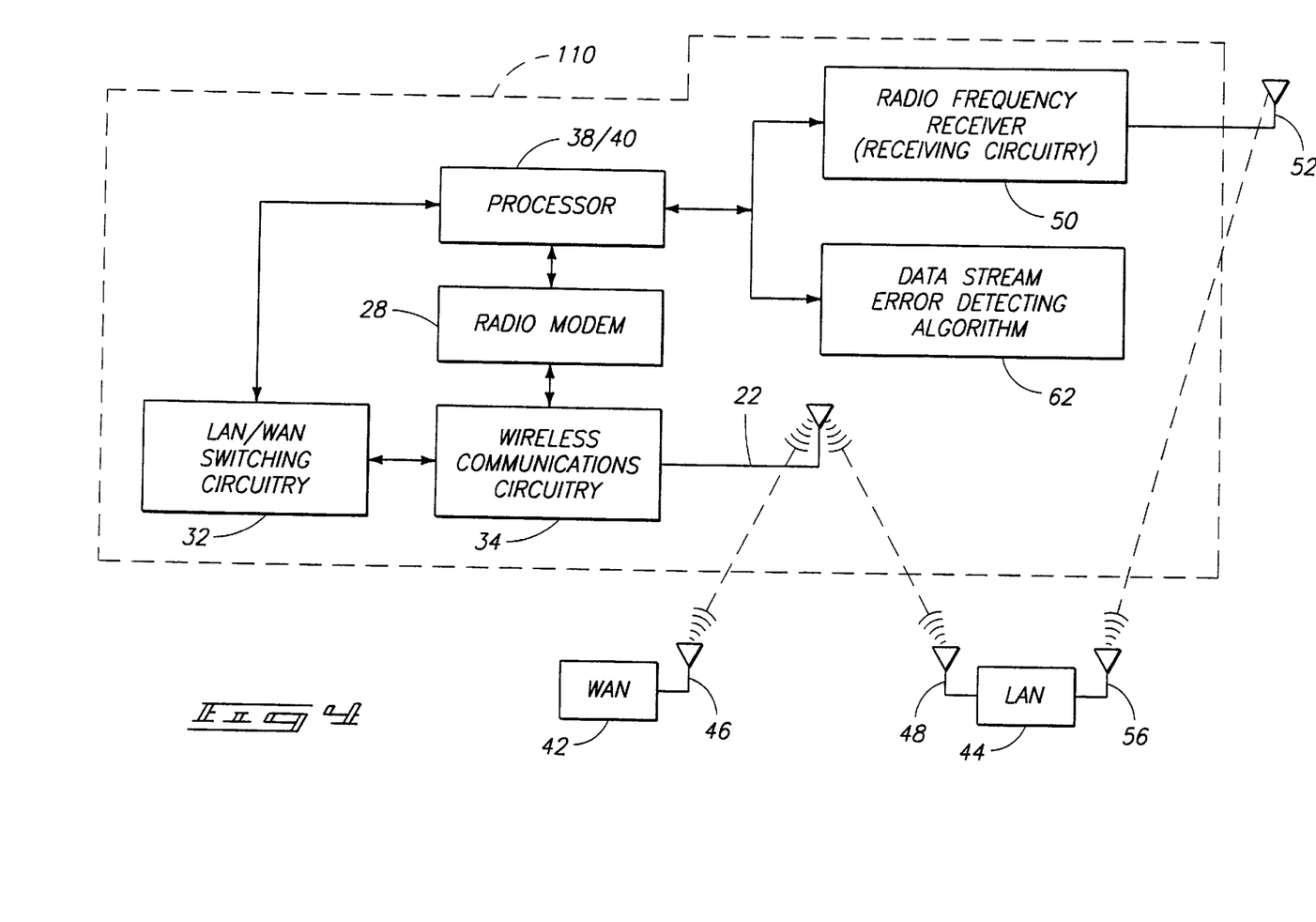
FIG. 4 is a schematic block diagram illustrating in further detail another technique using data stream error detection of received radio frequency (RF) signals for implementing the proximity detection device of FIG. 2.

FIG. 4 illustrates an alternative specific embodiment of a proximity detection device 36 (of FIG. 2). Namely, proximity detection of a portable electronic communications device 110 is implemented via a processor 38/40, radio frequency modem 28, LAN/WAN switching circuitry 32, wireless communications circuitry 34, and antenna 22 set up similar to that described in FIG. 3. Additionally, a radio frequency (RF) receiver 50 and a data stream error detecting algorithm 62 communicate, along with processor 38/40 to implement proximity detection. An antenna 52 receives RF signals from antenna 56 of LAN 44. Data stream error detecting algorithm 62 is implemented via processor 38/40 to detect bit stream errors in the received RF signals delivered by receiver 50. A detected increase in bit stream errors indicates a loss in quality of the wireless communications link, requiring transfer to WAN 42. As distance between antenna 52 and antenna 56 increases, the number of bit stream errors will also increase. Therefore, proximity detection can be implemented by monitoring the number of bit stream errors being detected. Such implementation forms another technique for monitoring the existence of a healthy communications signal providing the communications link between base, or LAN 44, and antenna 22 of device 110. In this manner, processor 38/40 looks for an error correction coding sequence, counting the number of corrupted bits. When the number of errors increases, device 110 switches to form a communications link with WAN 42.

One suitable error detecting algorithm is implemented by embedding error correcting code built into the data being received from LAN 44 via antenna 56. The simplest technique involves detecting bit errors. One such code is CHECKSUM, a cyclic redundancy code. Another is Reed Solomon code. Alternatively, any type of error detecting and/or correcting algorithm can be used. Such monitoring of the integrity of data streams received by receiver 50 and antenna 52 involves base band analysis, and does not involve radio communication, per se. Alternatively, the error correcting code could be embedded in the data stream between antennas 22 and 48, eliminating the need for antennas 52 and 56.

Figure 5:
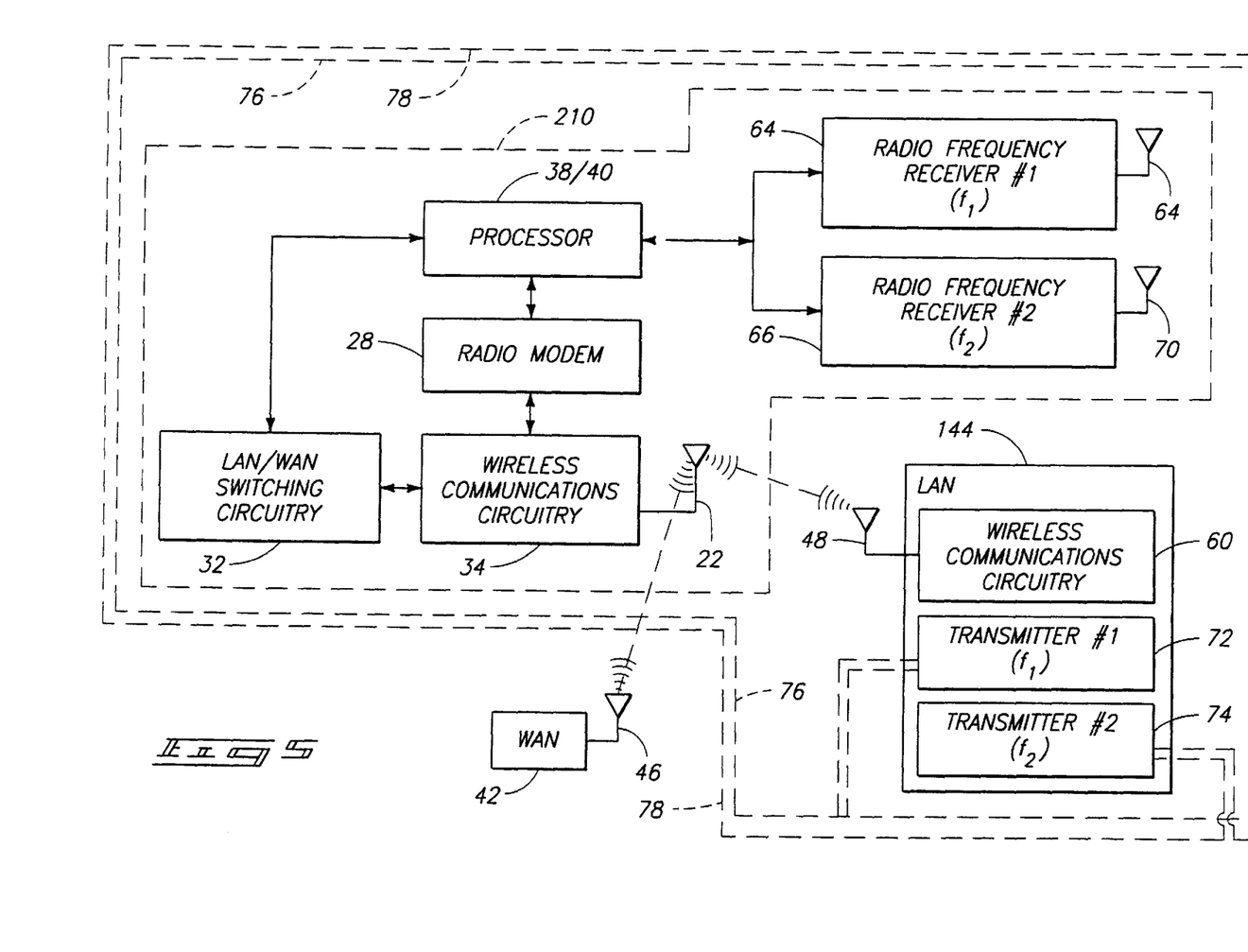
FIG. 5 is a schematic block diagram illustrating in further detail yet another technique using a pair of radio frequency (RF) ground wires for implementing the proximity detection device of FIG. 2.

FIG. 5 illustrates another alternative specific embodiment of a proximity detection device 36 (of FIG. 2). Namely, proximity detection of a portable electronic communication device 210 is implemented via a processor 38/40, radio modem 28, LAN/WAN switching circuitry 32, wireless communications circuitry 34, and antenna 22 set up similar to that described in FIG. 3. A first radio frequency (RF) receiver 64 and a second radio frequency (RF) receiver 66 cooperate with RF antennas 68 and 70, respectively, to provide the specific embodiment of a proximity detection device according to this implementation. More particularly, a first radio frequency transmitter 72 and a second radio frequency transmitter 74 are provided within LAN 144 signally connected with antennas 76 and 78, respectively. RF transmitter 72 emits an RF transmitting signal via antenna 76, having a first transmission frequency ($f_1$). Likewise, the second RF transmitter 74 transmits a second RF signal via antenna 78, having a transmitting frequency of ($f_2$). RF receiver 64 is configured to receive the transmitted signal from antenna 76 via receiving antenna 68. Similarly, RF receiver 66 is configured to receive the transmitted RF signal from antenna 78 via receiving antenna 70.

According to the construction of FIG. 5, antennas 76 and 78 are preferably laid out along a desired periphery of a local geographic area in which LAN 144 is desired to operate in wireless communication link with portable electronic communications device 210. According to this construction, antenna 76 is laid within the periphery of antenna 78, but parallel to the layout. Preferably, antennas 76 and 78 are laid out immediately adjacent to one another. By constructing antennas 76 and 78 to emit distinct frequencies, receivers 64 and 66 can discriminate the antennas to enable detection of when a user transports device 210 outside/inside of the desired geographic area of wireless operation for LAN 144. If a single wire (of antenna 76 or 78) is utilized in conjunction with a single receiver (of receiver 64 or 66), it is possible that a user might leave/enter the bounded area of the antenna in the region without being detected. Accordingly, device 210 would not recognize whether it is within the desired geographic location for use with LAN 144, or should be configured for communication with WAN 42. By providing a pair of antennas 76 and 78 and receivers 64 and 66, device 210 can discriminate whether it is leaving or entering the desired geographic operating region of LAN 144. Hence, antennas 76 and 78 and receivers 64 and 66 enable processor 38/40 to determine in which direction device 210 is crossing the operating boundaries of LAN 144.

Alternatively, a single one of antennas 76 and 78 and receivers 64 and 66 can be utilized to implement the proximity detection device of FIG. 5. However, with such a construction, it will be important to determine that device 210 be able to detect the RF signal from the antenna with each pass across its boundary. One example of a case where device 210 can "slip by" the antenna would be where a battery power-supplied device 210 is completely exhausted, disabling receiver 64.

Further alternatively, the device depicted in FIG. 5 can be implemented such that transmitter 72 and transmitter 74 operate at the same frequency, such that $f_1$ equals $f_2$. To distinguish antennas 76 and 78, transmitter 72 drives antenna 76 according to one modulation scheme, whereas transmitter 74 drives antenna 78 at a second, and different, modulation scheme. Receiver 64 is configured to detect the modulation scheme received from transmitter 72 and antenna 76, whereas receiver 66 is configured to detect the modulation scheme received from transmitter 74 and antenna 78.

Even further, alternative constructions for proximity detection device 36 (of FIG. 2) include use of a Global Positioning Satellite (GPS) receiver to detect proximity of a portable electronic communications device with a local area network. By providing a GPS receiver within a portable electronic communications device, the device can detect its proximate location relative to a transmitter of the local area network. One way is to assign position of the local area network transmitter as a way point, or reference point, in memory of the GPS receiver. The GPS receiver, operating off satellite signals, can accurately determine location of the device with reference to the way point. Hence, knowledge of transmitting and receiving signal integrity between the device and the local area network allows one to define a radius in which the local area network can be utilized by the device. Once outside of the radius, the device can reconfigure a wireless communication link with a wide area network. Alternatively, any device which allows for detection of proximity relative to a local area network can be utilized.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A portable electronic communications device, comprising:
    a radio frequency modem, wireless communications circuitry, and an antenna operable to communicate over a wireless communications link with one of a local area network and a wide area network; and
    a proximity detection device operable to detect proximity of the device with the local area network, the wireless communications circuitry responsive to detection of the device within suitable signal communication proximity with the local area network to couple the communications circuitry with the local area network.

2. The device of claim 1 wherein the radio frequency modem comprises a cellular radio frequency modem.

3. The device of claim 1 wherein the local area network and the wide area network each comprise wireless communications circuitry and a signal transmitting/receiving antenna, the device wireless communications circuitry selectively configurable to form a wireless communications link with one of the local area network and the wide area network.

4. The device of claim 1 wherein the proximity detection device comprises a radio frequency receiver, a receiving antenna coupled with the receiver, and a radio frequency power detector configured to detect received signal strength from radio signals transmitted from the local area network.

5. The device of claim 4 wherein the communications device further comprises switching circuitry responsive to detected received signal strength from the local area network to selectively signal couple the device wireless communications circuitry with one of the local area network and the wide area network.

6. The device of claim 5 wherein the communications device further comprises a signal processor coupled with the radio frequency receiver, the radio frequency power detector, the radio modem and wireless communications circuitry, and the switching circuitry, the signal processor operable to initiate detection of the device in acceptable signal proximity with the local area network to maintain a wireless communication link with the local area network when acceptable, and to switch the wireless communication link of the device with the wide area network when unacceptable.

7. The device of claim 1 wherein the proximity detection device comprises a radio frequency receiver, a receiving antenna coupled with the receiver, and a data stream error detecting device configured to detect data stream errors in a received signal from radio signals transmitted from the local area network.

8. The device of claim 1 wherein the proximity detection device comprises at least one radio frequency receiver coupled with a receiving antenna, and the local area network comprises a radio frequency transmitter and a loop antenna coupled to the antenna and extending along a periphery of a local geographic area intended for wireless communication with the local area network, the local area network transmitter and antenna sending an identified signal and the device receiver and antenna configured to detect transfer of the device across the local area network when entering and leaving the local geographic area intended for wireless communication with the local area network.

9. The device of claim 8 wherein the proximity detection device comprises a pair of radio frequency receivers and antennas, a first of the receivers and antennas operable to detect a first frequency signal and a second of the receivers and antennas operable to detect a second frequency signal, the local area network further comprising a pair of radio frequency transmitters and antennas, a first of the transmitters and antennas operating at the first transmitting frequency and the second of the transmitters and antennas operating at the second transmitting frequency, such providing a pair of wireless proximity communications links enabling direction identification of the device entering and leaving the local geographic area.

10. A portable electronic communications system, comprising:
    a local area network;
    a wide area network;
    a portable electronic communications device including a radio frequency modem, wireless communications circuitry, an antenna operable to communicate over a wireless communications link, and a proximity detection device operable to detect proximity of the device with the local area network, the wireless communications circuitry responsive to detection of the device outside of suitable signal communication proximity with the local area network to couple the communications circuitry with the wide area network.

11. In a portable electronic device having communications capabilities, a switchable wireless communications device comprising:
    a radio frequency modem, wireless communications circuitry, and an antenna operable to communicate over a wireless communications link with one of a local area network and a wide area network; and
    a proximity detection device operable to detect proximity of the device with the local area network, the wireless communications circuitry responsive to detection of the device within suitable signal communication proximity with the local area network to couple the communications circuitry with the local area network.

12. The device of claim 11 wherein the local area network and the wide area network each comprise wireless communications circuitry and a signal transmitting/receiving antenna, the device wireless communications circuitry selectively configurable to form a wireless communications link with one of the local area network and the wide area network.

13. The device of claim 11 wherein the proximity detection device comprises a radio frequency receiver, a receiving antenna coupled with the receiver, and a radio frequency power detector configured to detect received signal strength from radio signals transmitted from the local area network.

14. The device of claim 13 wherein the portable electronic device further comprises switching circuitry responsive to detected received signal strength from the local area network to selectively signal couple the device wireless communications circuitry with one of the local area network and the wide area network.

15. The device of claim 11 wherein the proximity detection device comprises a radio frequency receiver, a receiving antenna coupled with the receiver, and a data stream error detecting device configured to detect data stream errors in a received signal from radio signals transmitted from the local area network.

16. The device of claim 11 wherein the proximity detection device comprises at least one radio frequency receiver coupled with a receiving antenna, and the local area network comprises a radio frequency transmitter and a loop antenna coupled to the antenna and extending along a periphery of a local geographic area intended for wireless communication with the local area network, the local area network transmitter and antenna sending an identified signal and the device receiver and antenna configured to detect transfer of the device across the local area network when entering and leaving the local geographic area intended for wireless communication with the local area network.

17. A method for selectively coupling a portable electronic communications device with one of a local area network and a wide area network, comprising:

providing a local area network and a wide area network, each having wireless communications features;

providing a proximity detection device on the portable electronic communications device for detecting proximity of the device with the local area network; and configuring the portable electronic communications device in signal communication with the local area network when the proximity detection device detects the device within acceptable proximity with the local area network.

18. The method of claim 17 further comprising the step of configuring the portable electronic communications device in signal communication with the wide area network when the proximity detection device detects the device outside of acceptable proximity with the local area network.

19. A portable computer, comprising:

a radio frequency modem, wireless communications circuitry, and an antenna operable to communicate over a wireless communications link with one of a local area network and a wide area network; and a proximity detection device operable to detect proximity of the computer with the local area network, the wireless communications circuitry responsive to detection of the computer within suitable signal communication proximity with the local area network to couple the communications circuitry with the local area network.

20. The portable computer of claim 19 wherein the proximity detection device comprises a radio frequency receiver, a receiving antenna coupled with the receiver, and a radio frequency power detector configured to detect received signal strength from radio signals transmitted from the local area network.

21. The portable computer of claim 20 wherein the portable computer further comprises switching circuitry responsive to detected received signal strength from the local area network to selectively signal couple the wireless communications circuitry with one of the local area network and the wide area network.

22. The portable computer of claim 21 further comprising a signal processor coupled with the radio frequency receiver, the radio frequency power detector, the radio modem and wireless communications circuitry, and the switching circuitry, the signal processor operable to initiate detection of the computer in acceptable signal proximity with the local area network to maintain a wireless communication link with the local area network when acceptable, and to switch the wireless communication link of the computer with the wide area network when unacceptable.

* * * * *

UNITED STATES PATENT AND TRADEMARK OFFICE
CERTIFICATE OF CORRECTION

PATENT NO.      : 5,903,548

DATED           : May 11, 1999

INVENTOR(S)     : Jeff Delamater

It is certified that error appears in the above-identified patent and that said Letters Patent is hereby corrected as shown below:

In the Drawings:

Figure 5, reference numeral 64 for an "RF antenna" was incorrectly numbered in the drawings and thus was inconsistent with the specification. The reference numeral for said "RF antenna" should have been 68.

Signed and Sealed this

Twenty-eighth Day of September, 1999

Attest:

Q. TODD DICKINSON

Attesting Officer

Acting Commissioner of Patents and Trademarks